United States Patent [19]

Westlund et al.

[11] Patent Number: 4,481,064
[45] Date of Patent: Nov. 6, 1984

[54] DUAL ROTARY HEAD BANDING MACHINE

[76] Inventors: Gerald D. Westlund, 12164 Mississippi Dr.; Gerald A. Westlund, 13430 Yorktown La., both of Champlin, Minn. 55316

[21] Appl. No.: 450,065

[22] Filed: Dec. 15, 1982

[51] Int. Cl.³ .................... B32B 31/02; B65B 13/00
[52] U.S. Cl. ...................... 156/351; 156/86; 156/361; 156/521; 156/556; 156/568; 53/292; 53/399; 53/585
[58] Field of Search ............... 156/521, 556, 568, 86, 156/DIG. 12, DIG. 14, DIG. 15, DIG. 33, 351, 361; 53/291, 292, 296, 386, 399, 585; 29/775

[56] References Cited

U.S. PATENT DOCUMENTS

| | | | |
|---|---|---|---|
| 2,660,353 | 11/1953 | Gampp | 226/80 |
| 2,758,735 | 8/1956 | Carter | 156/DIG. 14 |
| 2,787,104 | 4/1957 | Carter | 53/292 |
| 2,846,835 | 8/1958 | Aguilar et al. | 53/291 |
| 3,340,591 | 9/1967 | Fisher et al. | 29/208 |
| 3,551,258 | 12/1970 | Galvanoni et al. | 156/556 |
| 3,888,067 | 6/1975 | Cross et al. | 53/292 |
| 4,016,704 | 4/1977 | Fujio | 53/3 |
| 4,179,863 | 12/1979 | Fresnel | 53/295 |
| 4,184,309 | 1/1980 | Amberg | 156/86 |
| 4,208,857 | 6/1980 | Fujio | 53/585 |
| 4,215,460 | 8/1980 | Amberg et al. | 29/429 |

Primary Examiner—Caleb Weston
Attorney, Agent, or Firm—Schroeder, Siegfried, Vidas & Arrett

[57] ABSTRACT

This disclosure is directed to a means for conveying a container or bottle from a first to a second location wherein a plastic tube feeding mechanism feeds a tubular flat folded heat-shrinkable strip above the conveying means and cuts the same into labels through a knife action where the labels are retrieved by a plurality of vacuum heads secured to a pair of transversely rotating wheels for depositing the labels over the container or bottle. The vacuum applied to the plurality of vacuum heads is controlled by a pair of manifolds secured to the wheels which are driven in synchronism with the means for conveying the containers or bottles. Two sources of vacuum are supplied to feed the pair of manifolds and, thus, supply a vacuum in alternate fashion to the two wheels.

13 Claims, 14 Drawing Figures

DUAL ROTARY HEAD BANDING MACHINE

BACKGROUND OF THE INVENTION

This invention relates to a machine for banding bottles and, more particularly, to a machine having a double vacuum head for accomplishing the same.

In carrying out the invention, bottles or containers are carried along a conveying mechanism to a worm screw conveyor where the bottle is guided underneath the label holding mechanism. The label is formed by passing a plastic strip, that is, a tubular flat folded heat-shrinkable strip to a cutting device where the strip is cut at the appropriate location to form a label that is to be passed over the outside of the container or bottle. The label is moved into place by being picked from its strip feeding mechanism through the use of a vacuum to a plurality of vacuum heads on a first wheel that picks up the label or band. Vacuum is then applied to the opposite wheel, and both sides of the plastic strip are then engaged by vacuum heads and, upon travelling in circular paths, the vacuum is first terminated to the lowermost heads as they move downwardly and divergingly away from each other until the final vacuum head loses its source of vacuum and the label drops over the container or bottle. Control of the vacuum to the vacuum heads is made through a pair of manifolds, each having one portion secured to the wheel that carries the vacuum heads and a second portion feeding the first from a vacuum pump. A synchronous drive mechanism is used to connect the conveying mechanism to the pair of wheels to insure a proper rate of movement of the containers is maintained with respect to the wheels. Of course, the speed of the machine may be doubled by supplying a pair of band or label feeding mechanisms above the two wheels carrying the vacuum heads.

The machine is made even more versatile by providing means for changing the relative vertical distance between the vacuum heads and the conveyor mechanism. That is, the heads may be moved downwardly toward the conveyor or the conveyor may be moved upwardly toward the heads. Once the bands or labels are passed over the bottles, the conveyor moves them into the ovens where the plastic material is shrunk to fit tightly over the bottle or container.

This invention comprises an improvement over the apparatus and methods disclosed in U.S. Pat. No. 4,215,460 which issued Aug. 5, 1980. That particular reference makes no disclosure of any manifold that is used with the mechanism to control the various heads for securing a cut band or label from a magazine and spreading the same so that a bottleneck may have the band or label fall over the same. Additionally, there is no provision made for moving the vacuum heads with respect to the conveyor for different height bottles.

U.S. Pat. No. 3,340,591 also discloses a bottle banding machine wherein a nest of collars are held in a horizontal position in a magazine and drawn from the magazine. The magazine produces labels which are formed in a funnel position upon removal and, thus, this machine does not have the capabilities of making use of a long tube of preformed labels.

Another machine is disclosed in U.S. Pat. No. 3,738,210 for opening a tubular band drawn from a reel through the use of a mandrel. A collar mechanism is secured about the outer part of the band and is used to draw the band over the mandrel where its movement is aided through the use of rollers.

SUMMARY OF THE INVENTION

From the above description of the invention, it will be seen that it is a general object of this invention to provide a banding machine that operates with high speed and accuracy.

It is still another object of this invention to provide a machine that makes use of a plurality of vacuum heads to spread a label before releasing the same over a container or bottle.

It is yet a further object of this invention to provide a banding mechanism that is useable with containers of different heights.

It is still another object of this invention to provide a pair of manifolds connected with the rotating vacuum heads for control thereof.

It is yet another object of this invention to provide sensors for determining the location of cut labels before they are retrieved by the vacuum heads.

It is still a further object of this invention to provide a worm conveyor with a dwell section to move the containers under the vacuum heads.

It is still another object of this invention to provide a means of controlling the action of the cutting knife in creating labels of different lengths.

BRIEF DESCRIPTION OF THE DRAWINGS

A detailed description of one preferred embodiment of the invention is hereafter described with specific reference being made to the drawings in which.

DETAILED DESCRIPTION OF THE INVENTION

Figure 1:
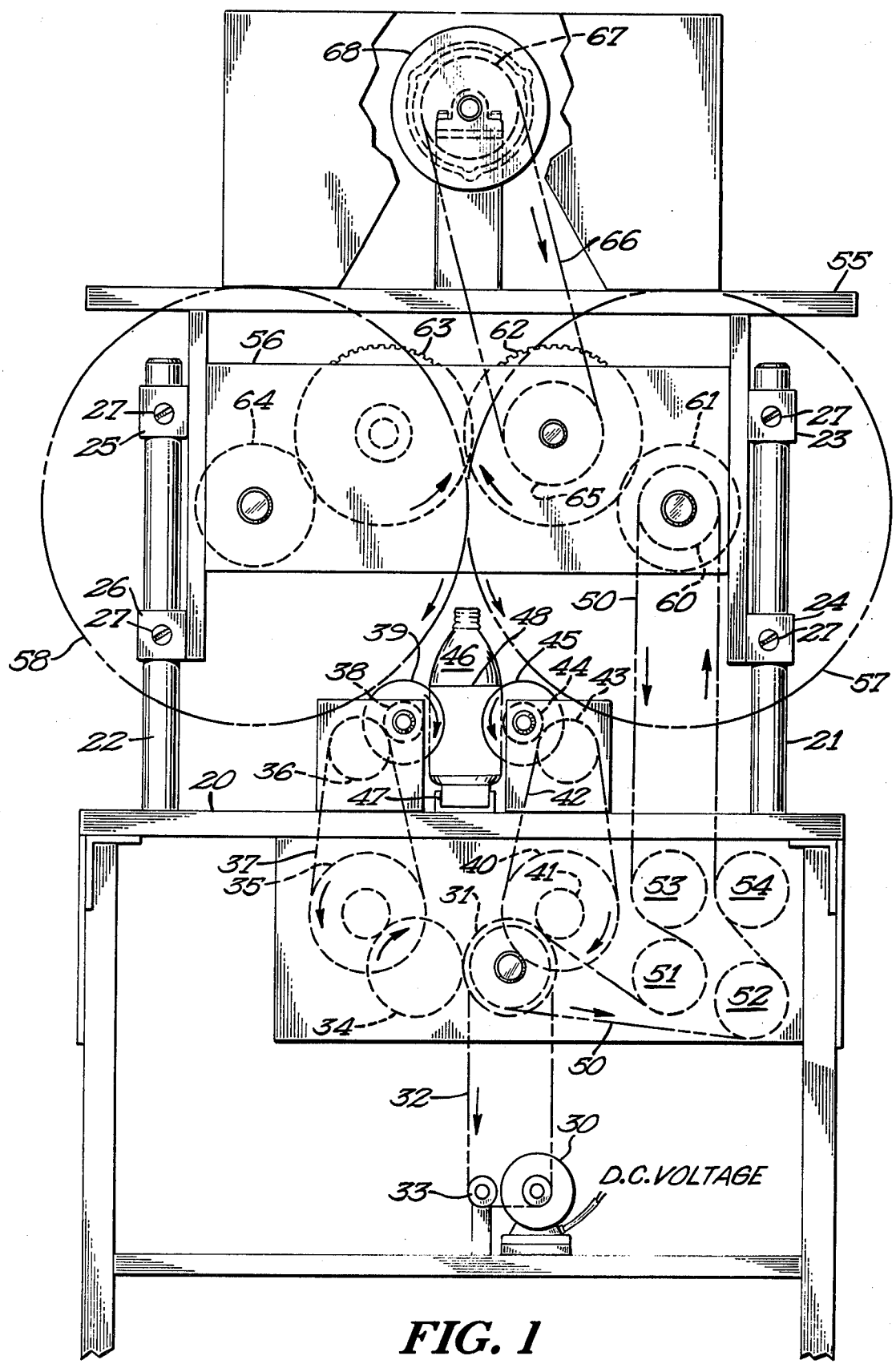
FIG. 1 is a front elevation of the invention disclosing the driving mechanism in schematic form.

Turning now to FIG. 1, there is disclosed a horizontal base plate 20 that is used as the base for the mechanism. Secured to base plate 20 are at least a pair of posts 21 and 22 extending vertically in an upward direction. Secured about posts 21 and 22 are a plurality of sleeves 23, 24, 25 and 26 that may be anchored in place through the use of releasable securing means, such as set screws 27. It will be assumed that the proper height has been selected for the mechanism as disclosed in FIG. 1.

A driving mechanism is disclosed beneath platform 20 in the form of a DC motor 30 so that the speed of the driven mechanism may be changed according to the wishes of the operator. Direct current motor 30 is connected to a driven sprocket 31 through a chain 32 that passes over an idler pulley 33. A gear 34 is driven by a sprocket and gear 31 to produce a rotational movement to a sprocket 35. Sprocket 35 is connected to another sprocket 36 through a suitable chain 37. Sprocket 36 is in a driving relationship with a gear 38 that is connected to a worm screw conveyor 39.

In a similar manner, another sprocket 40 is driven through a gear 41 that communicates with sprocket and gear 31. Sprocket 40 drives a chain 42 to produce a rotational movement of a gear 43 that drives a gear 44 that is secured to the end of another worm screw conveyor 45. It will be observed that worm screw conveyors 39 and 45 turn in such a manner that a bottle 46 will be propelled from the receiving to the discharge end of the machine along a conveyor mechanism 47. That is, conveyor mechanism 47 receives a number of bottles at an assembly point and moves the bottles into position for banding where they encounter the two worm screw conveyors 39 and 45 and are propelled forwardly for banding and are eventually again picked up by the conveyor 47 and moved into an oven for shrinking a band 48.

A chain 50 is secured around another section of sprocket 31 and its tightness and direction of movement is controlled through a plurality of four idler pulleys 51, 52, 53 and 54. An upper portion of a support mechanism 55 is secured to sleeves 23 through 26 and a cross member 56 forms a base or supporting member for a pair of wheels 57 and 58. A first sprocket member 60 is driven by chain 50 and has a second gear portion 61 secured to sprocket 60 for driving another gear and sprocket member 62. Gear 62 drives another gear 63 and the drive train is completed by meshing gear 63 with another gear 64 connected to wheel 58. Thus, through the driving arrangement just described, wheel 58 moves clockwise and wheel 57 moves counterclockwise, both working together and both moving downwardly with respect to bottle 46.

Sprocket member 62 is connected to a sprocket 65 that drives chain 66 and is connected to another gear and sprocket member 67. Sprocket member 67 is connected to a cam member 68 that is used to operate a knife for cutting the labels from the reel of flattened, tubular plastic material.

Figure 4:
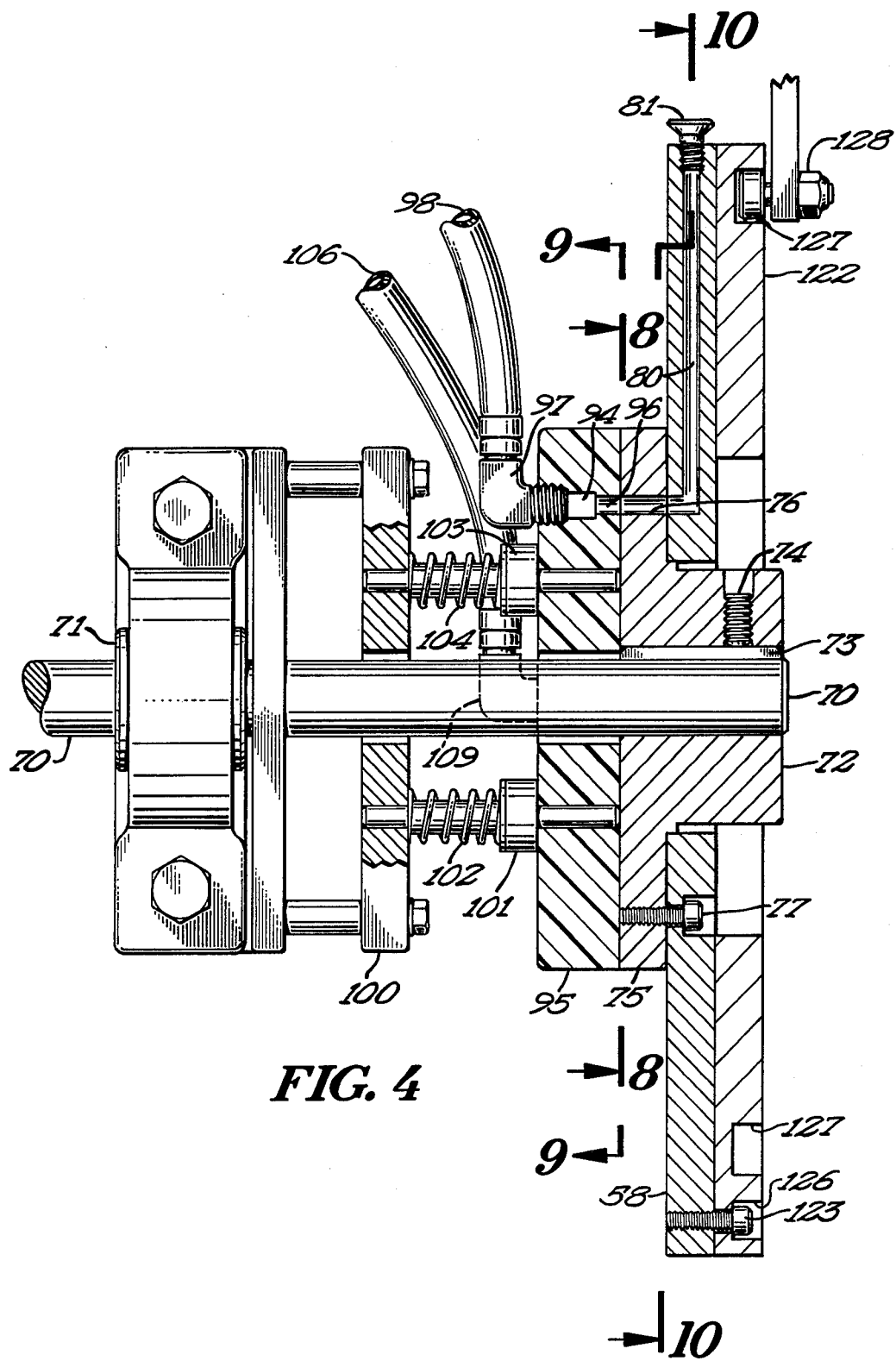
FIG. 4 is a sectional view of the vacuum wheels, manifolds and heads of the invention.
Figure 8:
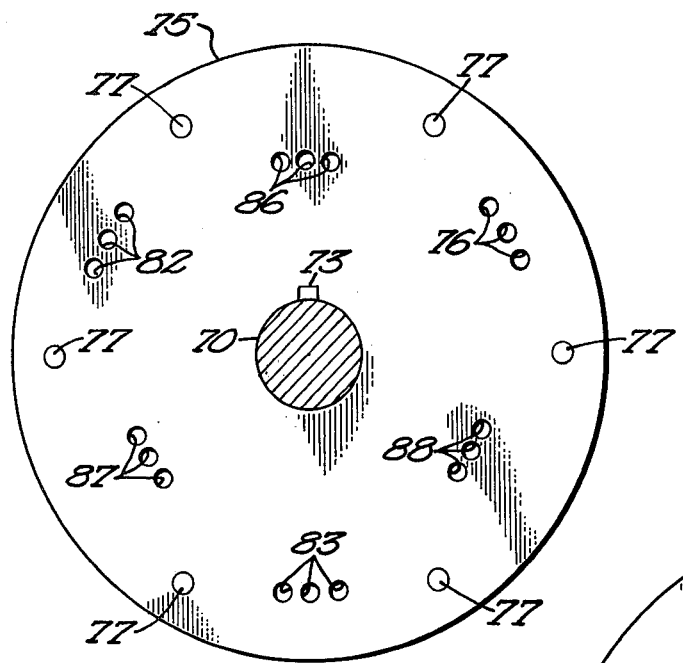
FIG. 8 is a portion of the manifold taken along lines 8—8 of FIG. 4.
Figure 10:
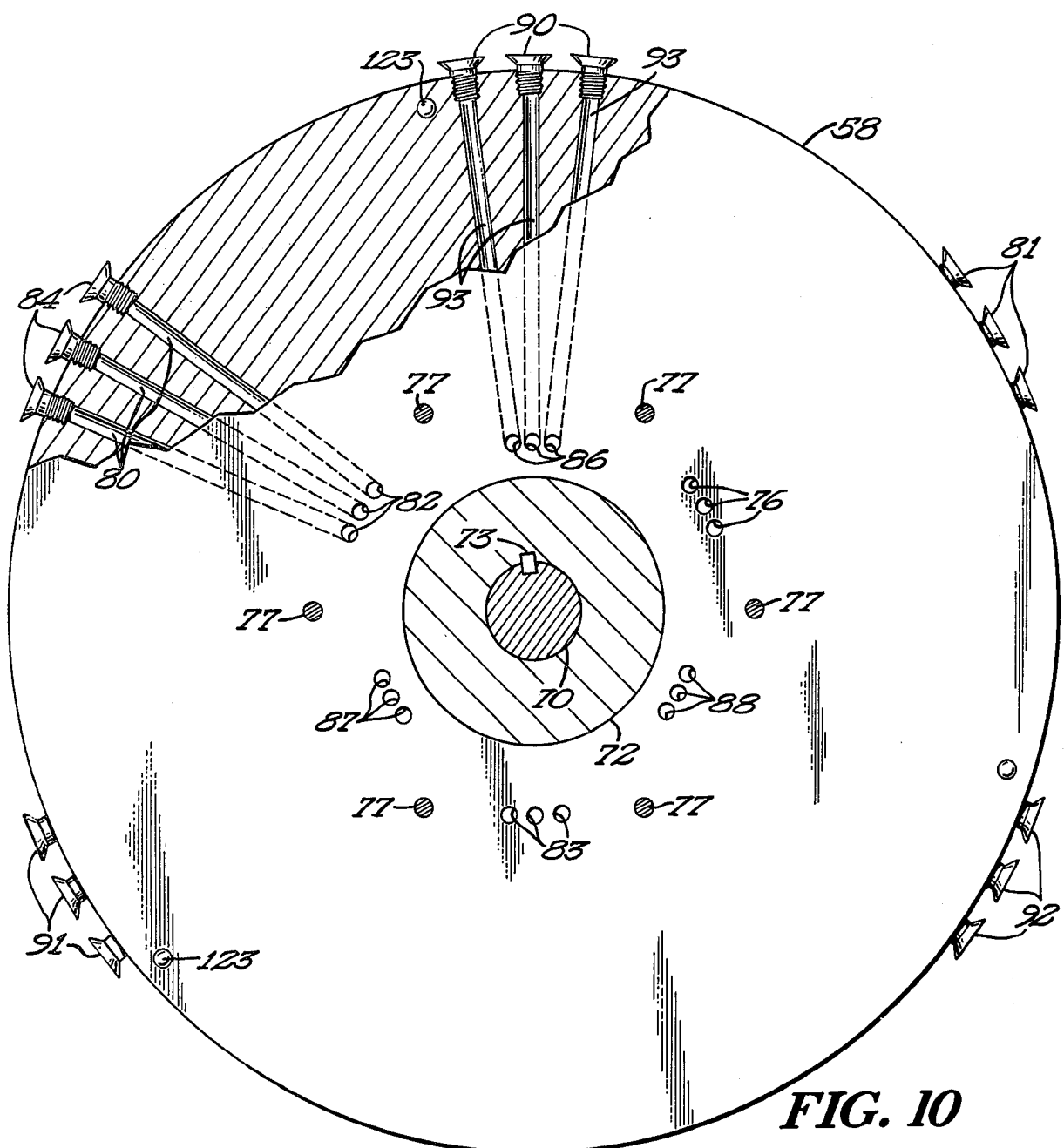
FIG. 10 is a sectional view of one of the pair of wheels carrying the vacuum head.

Turning now to FIG. 4, there is disclosed wheel 58 which revolves about an axis in the form of a shaft 70 that is suitably supported in bearing journals, such as 71. A hub 72 is secured to shaft 70 through suitable means, such as a key 73 and a set screw 74. Hub 72 is, in reality, a portion of a manifold 75 and is generally formed of steel with a plurality of bores 76 formed therein. Manifold member 75 is secured to wheel 58 by suitable means, such as machine screws 77. In other words, each of bores 76 mates with another similar bore in wheel 58, as shown in FIG. 10. Thus, there will be seen three separate sets of bores which are generally 120° from each other as measured around manifold 75. Bores 76 each mate with a similar plurality of radial bores 80 formed in wheel 58. Each of radial bores 80 terminate at the extremity in the form of a vacuum cup 81. In a similar manner, another plurality of bores 82 and a third plurality of bores 83 are each connected to a plurality of vacuum cups 84 and 85. The radius from shaft 70 to bores 76, 82 and 83 are all equal and are generally shown to be slightly greater than another plurality of bores designed 86, 87 and 88. Thus, each of the bores formed in manifold 75, designated 86, 87 and 88, mate with similar bores formed in wheel 58 and, upon each of those bores being connected to a plurality of vacuum cups 90, 91 and 92 through a plurality of bores 93 formed in wheel 58, an alternate source of vacuum may be applied to each of the vacuum cups.

Figure 11:
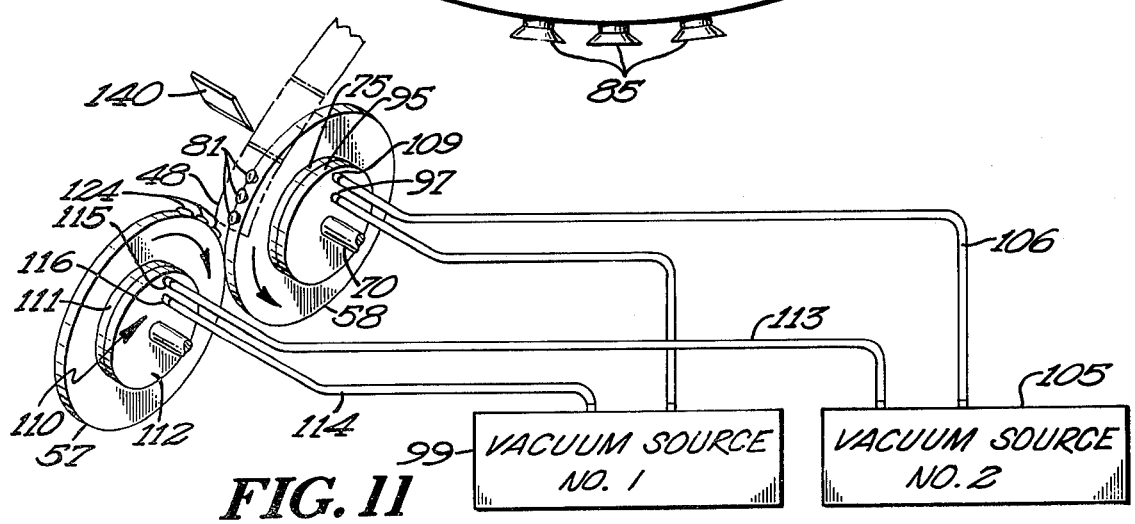
FIG. 11 is a schematic drawing of the vacuum system to the invention.

Each of bores 76, 82 and 83 are radially aligned with a curved slot 94 formed in a stationary member 95 (FIG. 4), forming the second portion of manifold 75. Thus, the time or duration for which a vacuum is applied to each of the heads 81, 84 or 85 is controlled by the extent of the arc of slot 94. Another bore 96 is formed in the rear face of manifold 95 into which a connector 97 is secured (FIG. 4) and is connected through suitable means, such as a hose 98, to a vacuum source 99 (FIG. 11). Because manifold section 75 is rotating and section 95 is held stationary, it is desirable to maintain sufficient axial pressure against plate 95 to prevent leakage as it bears against manifold section 75. This is accomplished through the use of a backing plate 100 that supports a stud and collar 101 held in place through the use of a compression spring 102. A similar arrangement is formed on the other side of shaft 70 through the use of a stud arrangement 103 and a compression spring 104.

Figure 9:
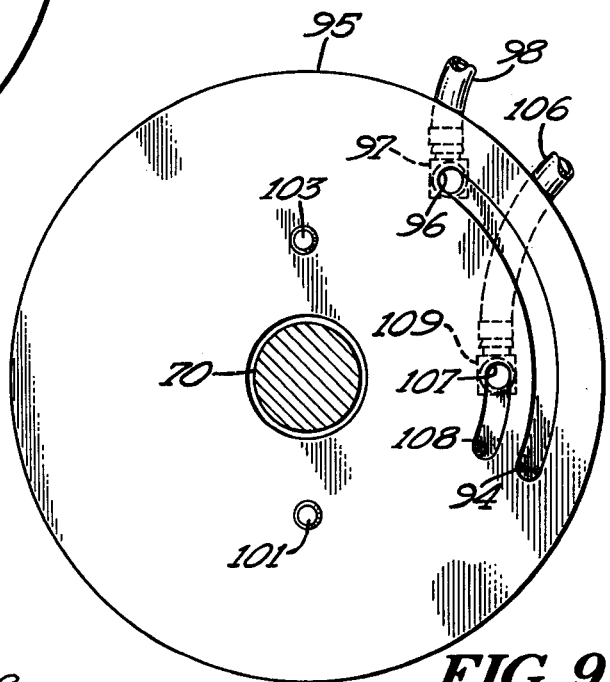
FIG. 9 is a stationary portion of the manifold taken along lines 9—9 of FIG. 4.

As seen in FIG. 9, studs 101 and 103 project through a pair of bores formed in manifold member 95.

In a manner similar to that just described, each of the series of bores 86 communicates with another vacuum source 105 (FIG. 11) through a tubular connection 106 and a bore 107 communicating with a slot 108. Slot 108 is of a smaller segment than that of slot 94 and at a shorter radius so that vacuum heads 90, 91 and 92 may be controlled separately and independently from the other vacuum heads on wheel 58 and the corresponding vacuum heads on wheel 57. Another right angle connector 109 directs the vacuum into vacuum member 95. It will also be observed that the same form of connections will be found for a manifold 110 having a moving part 111 and a stationary portion 112. Vacuum 105 is connected to manifold section 112 through a suitable hose connection 113 (like that of connections 98 and 97) and another hose 114 is connected to vacuum 99 in the manner hose 106 and connection 109 are made. Both vacuums 99 and 105 are formed through the use of a vacuum pump which is of the usual type found in commercial applications. The two connections are made through a connector 115 connected to line 113 and a connector 116 connected to line 114.

Figure 2:
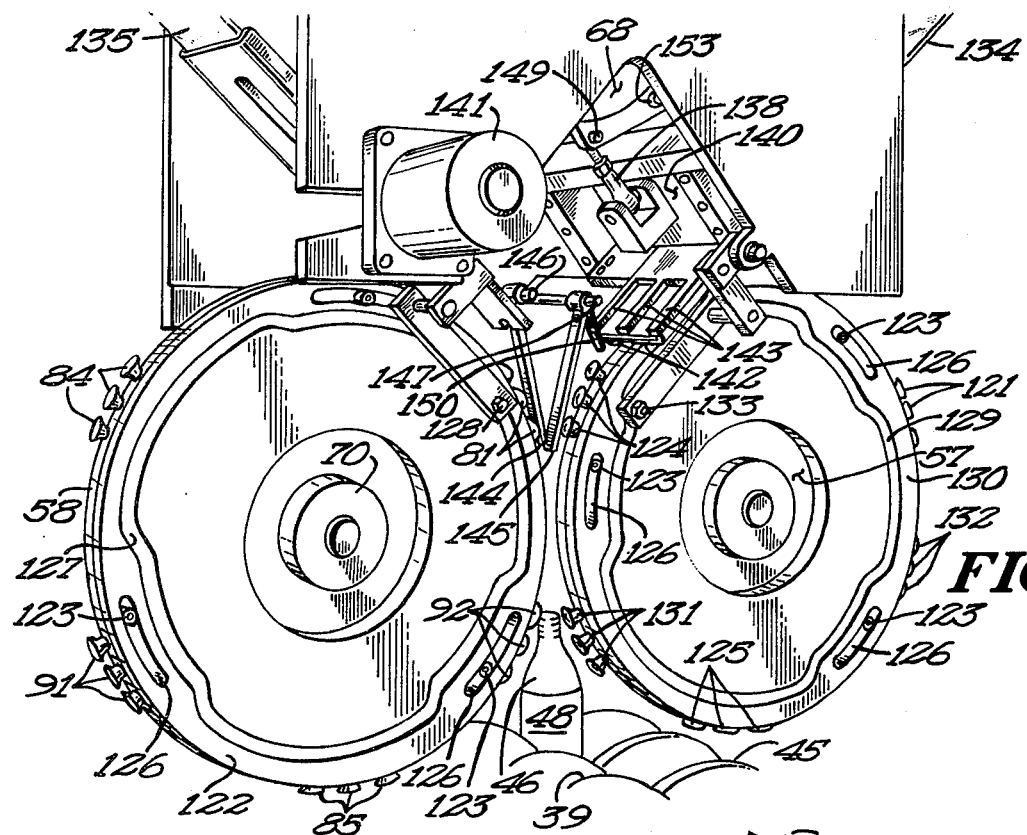
FIG. 2 is a perspective view of the upper portion of the labelling machine.
Figure 6:
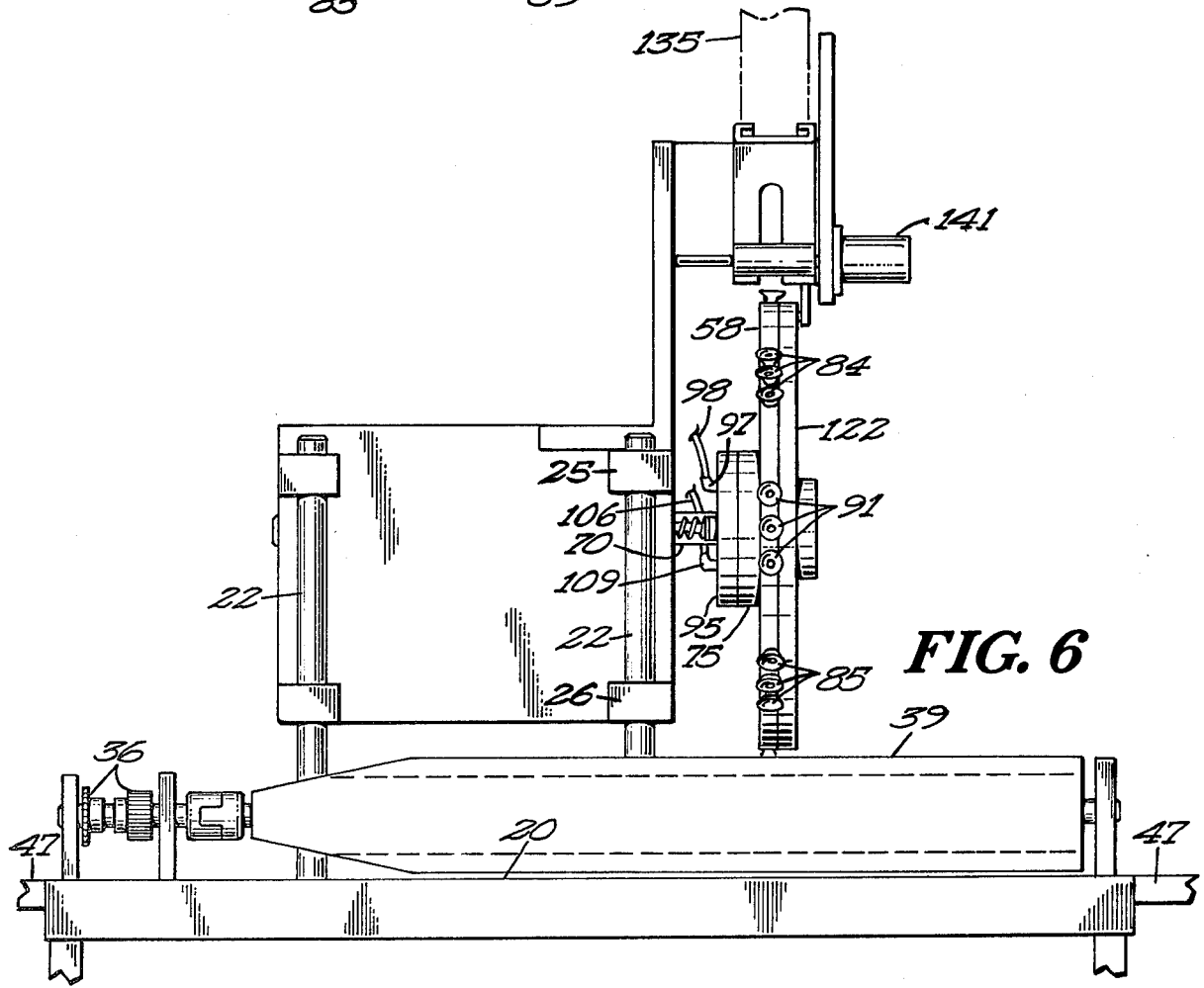
FIG. 6 is a side elevation of the invention.
Figure 3:
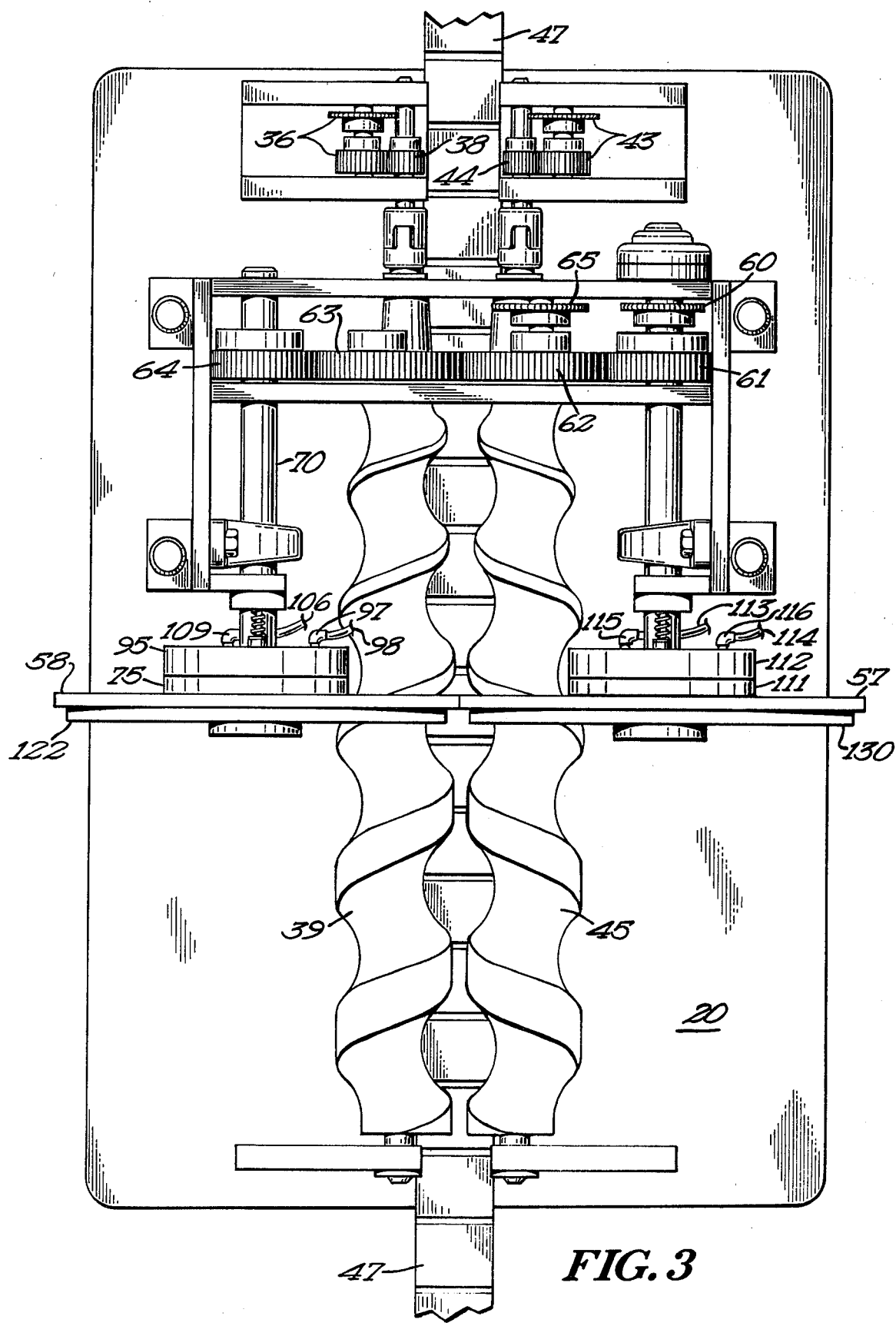
FIG. 3 is a top plan view of the banding wheels overlooking the conveyor mechanism.

In FIG. 2, there is shown both pairs of wheels 58 and 57 in which the corresponding vacuum heads are identified as 124, 131, 125, 132 and 121, with the other vacuum heads being obscured by other associated components. A cam plate 122 is secured to wheel 58 through suitable means, such as machines screws 123 and another machine screw not shown which ride in curved slots 126 so that cam member 122 may be adjusted circumferentially with respect to wheel 58. A groove 127 is formed around the edge of cam member 122 and has three repeat positions which cause a cam follower 128 to be actuated thereby.

In a manner just described, another cam member 130 is secured to wheel 57 through suitable means such as machine screws 123, each of the machines screws operating within a curved slot 126 forming a segment for adjustability. Cam member 130 also includes another groove 129 like groove 127 just described. That is, each of the cam members 122 and 130 may be rotated so that cam follower 128 and another cam follower 133 may be adjusted so that their mechanisms are either advanced or retarded with respect to the time when it will be actuated.

Figure 5:
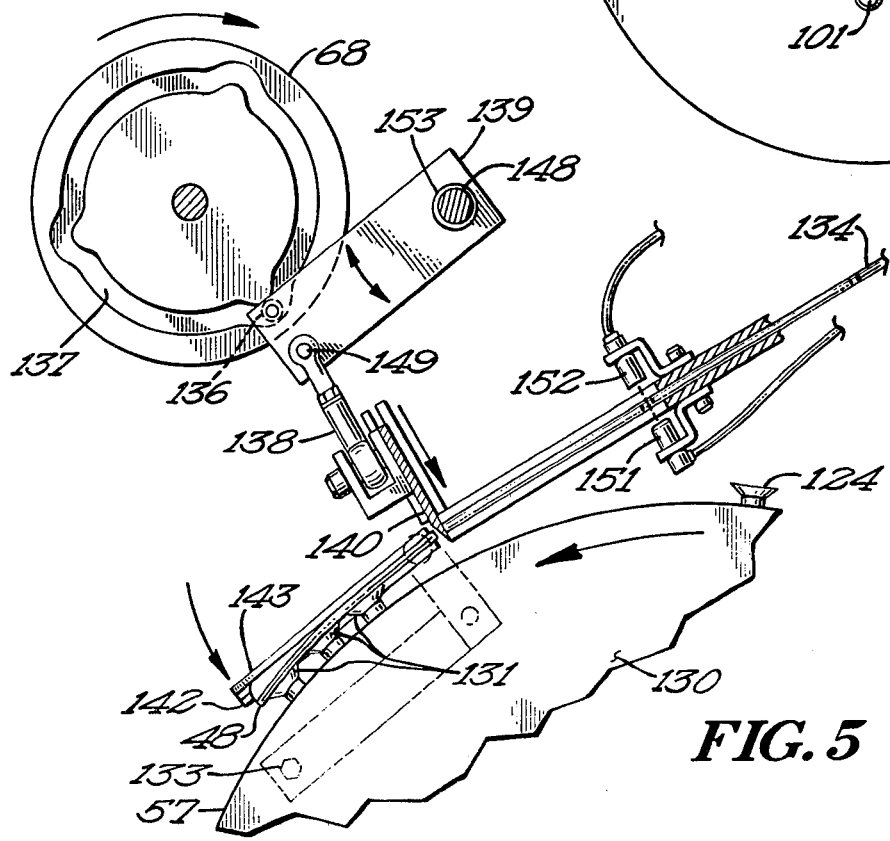
FIG. 5 is a side elevation of the label cutting mechanism.
Figure 7A:
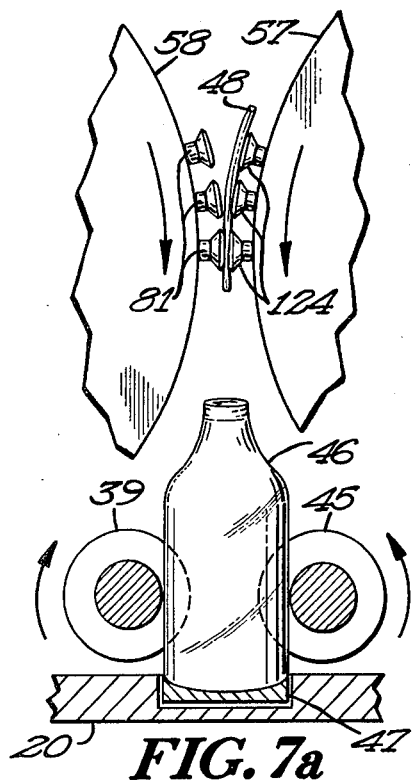
FIGS. 7a, b, c and d are diagrammatic views of the label shown in four different stages of opening.
Figure 7B:
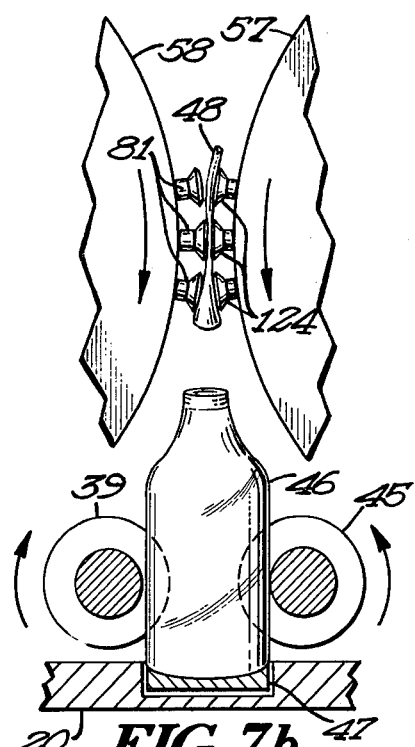
Figure 7C:
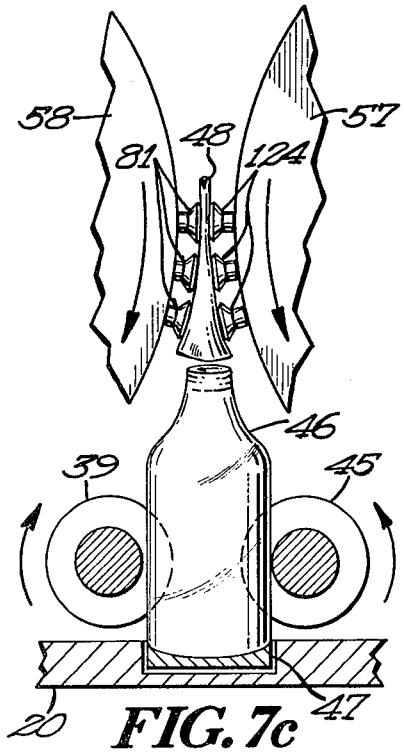
Figure 7D:
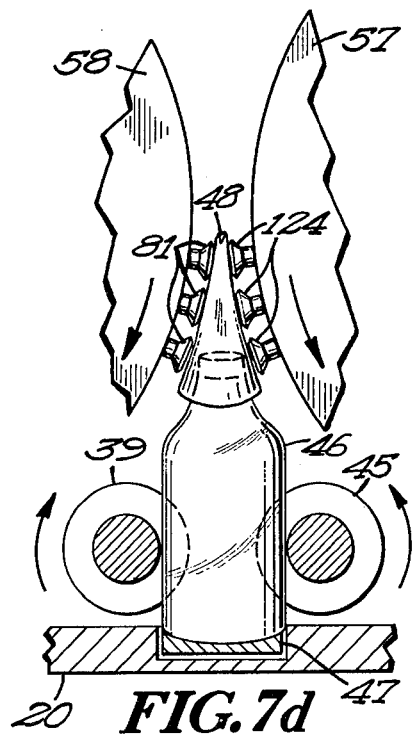

Referring specifically to the mechanism for containing the movement of a band (FIG. 2), there is disclosed a plastic strip that is a tubular flat folded heat-shrinkable strip 134 that is coiled and carried in reel form. On the opposite side, there is another roll of tubular flat folded heat-shrinkable material 135. Keeping in mind that cam 68 (FIG. 5) is also driven by the same gearing mechanism, it will be seen that a cam follower 136 follows the cam path and in so doing causes a bar 139 to oscillate about a shaft 148 and its bearing 153. Disposed generally below cam follower 136, is a stud 149 that is secured to bar 139 and an arm 138 is pivotally connected to a knife 140. Upon cam follower 136 following the groove 137, guillotine knife 140 is moved upwardly and downwardly to cut the tubular label material 134. The label materials, such as materials 134 and 135, are moved by a stepping motor 141 that drives a pair of pinch rollers (not shown) that propel the label material into place. The label material, once cut, then falls upon a lower set of fingers 142 and is held in place by an upper set of fingers 143. To insure that the vacuum cups do, in fact, engage the label 48 that has been cut from tubular material 134, the grooves for the cams are rotated so that the follower, in following the groove, dips inwardly, and fingers 143 are pressed against the upper side of the label causing it to be impressed upon vacuum heads 121, 124 and 125. In other words, the heads are approximately 120° from each other. On the other hand, cam 122 on wheel 58 is actuated and synchronized with the movement of wheel 57 so that the vacuum is applied to heads 81 in a timed sequence coming after the introduction of the vacuum to heads 124 and, thus, band 48 is first stripped from its holding mechanism between fingers 142 and 143 and, upon the band reaching a further downstream position, vacuum is applied to heads 81, causing the other side of the band to be drawn against vacuum heads 81.

To insure that the labels, such as 48, do not permit the side which has no vacuum applied from ballooning outwardly and catching the air stream and thus attempt to open the label prematurely, a pair of suppression bars 144 and 145 are employed. Each suppression bar is secured to a pivotal post member 146 and 147, respectively. To insure that the cut band 48 is in a proper place after being cut, a label stop member 150 engages the label as it moves downwardly. To insure that the label is cut in the proper manner, a sensor 151 (FIG. 5), disposed adjacent the path of travel of the tubular plastic member 134, receives light from a lamp source 152 that starts the predetermined movement of stepper motor 141 and permits guillotine 140 to cut the tubular plastic member after it has stopped movement. The other cutting mechanism is identical to that described where each sensor is connected to the other and to both feeding mechanisms to control the release of a label.

Thus, both stationary portions 95 and 112 of each manifold are identical to each other in providing the form of vacuum to each of the heads. That is, when wheel 57 has vacuum cups 124 energized, vacuum cups 81 will have vacuum applied at a later time. When vacuum cups 90 next pick up a label, vacuum heads on wheel 57 are first deenergized and then later receive their vacuum to draw the label portions apart.

There is shown a diagrammatical presentation of the opening of a label 48 in FIGS. 7a through 7d. As first seen in FIG. 7a, label 48 is attached to each of the vacuum heads 124 as the label leaves the cutting and holding mechanism. It will be seen that vacuum cups 81 at this point do not have a vacuum applied thereto. As the band 48 is moved downwardly (FIG. 7b), wheels 57 and 58 start to diverge after the leading vacuum cups 124 and 81 move beneath a horizontal plane through the pivot axes of each wheel. As wheels 57 and 58 assume the position shown in FIG. 7c, the leading heads on each wheel are deenergized because the vacuum will have been cut to both vacuum heads. As the two wheels 57 and 58 move further in their divergent travel (FIG. 7d), label 48 is opened further and continues to move out over bottle 46. It is during this operation that the dwell section of the two worm screw conveyors is moving bottle 46.

From FIG. 9, it will be observed that the origin of slot 108 is approximately 51° behind the origin of the slot in the other manifold and the termination of both slots is coincidentally some 110° from the origin of the slot in manifold 95.

In considering this invention, it should be remembered that the present disclosure is illustrative only and the scope of the invention should be determined by the appended claims.

What is claimed is:
1. A dual head banding apparatus applying a tubular band to a container, comprising:
 (a) conveying means disposed along a longitudinal axis of said apparatus for moving containers from a first location of said machine to a second location,
 (b) at least one plastic strip feeding mechanism feeding a tubular flat folded heat-shrinkable strip above said conveying means;
 (c) a cutting device for cutting the plastic strip into a plurality of labels of predetermined length and diameter while in said flat-folded condition, said feeding mechanism containing the labels until retrieved;
 (d) a pair of wheels revolving about axes disposed substantially parallel to, above and transversely disposed from, said longitudinal axis and having a plurality of vacuum heads secured thereto, said vacuum heads disposed in groups around the periphery of each of said wheels for retrieving said plurality of labels from said tubular strip feeding mechanism and engaging the same on both sides until depositing the same over a container;
 (e) a source of vacuum;
 (f) a pair of manifolds each having a first portion communicating with said revolving wheels and vacuum heads and having a second fixed portion constructed and arranged to communicate with said first portion and at least said source of vacuum, said manifolds connecting said source of vacuum to said plurality of vacuum heads; and
 (g) a synchronous drive mechanism connecting said conveying means to said pair of wheels to ensure a proper rate of movement of said containers under said wheel.
2. The structure set forth in claim 1 including:
 (h) a second plastic strip feeding mechanism disposed above and transversely opposite said first plastic strip feeding mechanism; and
 (i) a pair of sensor means sensing the condition of each tubular flat folded heat-shrinkable strip, each of said sensor means connected to the other and to said first and second plastic strip feeding mechanism to control the release of a label.

3. The structure set forth in claim 1 including:
(j) a cam driven synchronously with said plastic strip feed mechanism and said cutting device to cause said cutting device to cut through the plastic strip.

4. The structure set forth in claim 1 wherein said conveying means includes a belt conveyor and at least one worm screw conveyor, said worm screw conveyor spacing the containers immediately below and aligned with said pair of wheels, said belt conveyor conveying said containers to and from said worm screw conveyor.

5. The structure set forth in claim 1 wherein three vacuum heads form a group and the vacuum is sequentially terminated as each head of each group moves vertically lower towards the conveying means.

6. The structure set forth in claim 1 wherein said source of vacuum includes at least a pair of vacuum pumps, one connected to each of said pair of manifolds.

7. The structure set forth in claim 2 including:
(k) means for varying the vertical distance between said conveying means, and said first and second plastic strip feeding mechanism and said pair of wheels to accommodate containers of varying heights.

8. The structure set forth in claim 2 including:
(l) a pair of cam members secured to said pair of wheels wherein the controlling surfaces have different radii representative of functions to be applied to said plastic strip feeding mechanisms; and
(m) a pair of cam followers following the control surfaces of said pair of cam members and operably connected to said plastic strip feeding mechanisms to urge the same into communication with the strip to be cut.

9. The structure set forth in claim 8 including:
(n) a plurality of releasable fastening means permitting said pair of cam members to rotate with respect to said pair of wheels and advance or retard the functions to be applied to said plastic strip feeding mechanisms.

10. The structure set forth in claim 9 wherein said manifold opposite said plastic strip feeding mechanism having a label ready for pick-up by a group of said vacuum heads has a corresponding curved slot formed in said second portion that originates behind the origin of said other curved slot in said other manifold, and both slots terminate at about twice the arc from origin downstream in the slot formed in said other manifold.

11. The structure set forth in claim 2 including:
(o) a pair of suppression bars pivotally suspended at their upper ends and resting against the upper portion of the labels cut from the tubular flat folded heat-shrinkable strips to prevent the labels from opening while in contact with the same.

12. The structure set forth in claim 4 wherein said worm screw conveyor includes a dwell section immediately below and aligned with said pair of wheels.

13. The structure set forth in claim 10 wherein the origin of said slot formed opposite said plastic feeding mechanism in said manifold is approximately 51° behind the origin of the slot in the other manifold and the termination of both slots is coincidentally some 110° from the origin of the slot in said other manifold.

* * * * *